(12) United States Patent
Weidinger

(10) Patent No.: US 6,505,724 B2
(45) Date of Patent: Jan. 14, 2003

(54) THRUST PLATE ASSEMBLY

(75) Inventor: Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/903,214

(22) Filed: Jul. 11, 2001

(65) Prior Publication Data

US 2002/0020599 A1 Feb. 21, 2002

(30) Foreign Application Priority Data

Jul. 21, 2000 (DE) .......................... 100 35 491

(51) Int. Cl.[7] ............................................. F16D 13/75
(52) U.S. Cl. ................. 192/70.25; 192/111 A; 29/446
(58) Field of Search ................... 192/70.25, 111 A; 29/446

(56) References Cited

U.S. PATENT DOCUMENTS

| | | | | |
|---|---|---|---|---|
| 5,904,233 A | * | 5/1999 | Hashimoto ............... | 192/70.25 |
| 5,975,268 A | * | 11/1999 | Weidinger et al. ........ | 192/70.25 |
| 5,988,338 A | * | 11/1999 | Maucher ................... | 192/70.25 |
| 6,123,180 A | * | 9/2000 | Weidinger ................ | 192/70.25 |
| 6,202,817 B1 | * | 3/2001 | Link et al. ................ | 192/70.25 |

FOREIGN PATENT DOCUMENTS

DE     19922724 A1 * 11/2000 ........... F16D/13/75

* cited by examiner

Primary Examiner—Richard M. Lorence
(74) Attorney, Agent, or Firm—Cohen, Pontani, Lieberman & Pavane

(57) ABSTRACT

A thrust plate assembly for a motor vehicle friction clutch with automatic wear compensation includes a housing, a pressure plate, a force accumulator arranged between the housing and the pressure plate, a wear adjustment device arranged in a support path of the force accumulator, and a play indicator arranged on a component of the thrust plate assembly and including a blocking/detection arrangement with a blocking section acting on the wear adjustment device, and a detection section for interacting with a stop element arranged on another component of the thrust plate assembly. The stop element has face sections in different axial positions for interaction with the detection section, wherein a particular face section may be selected for interaction with the detection section by adjusting the position of the stop element relative to the another component.

27 Claims, 4 Drawing Sheets

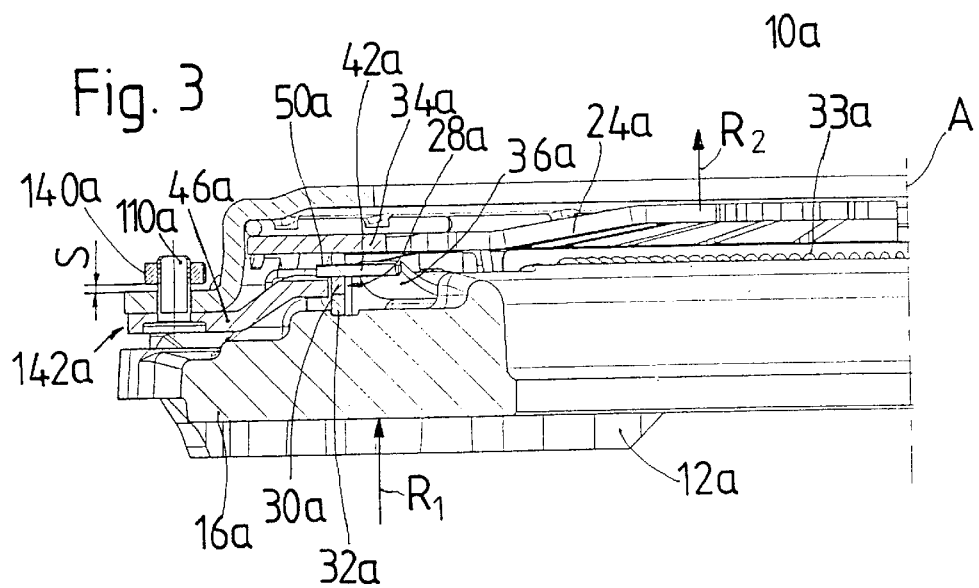
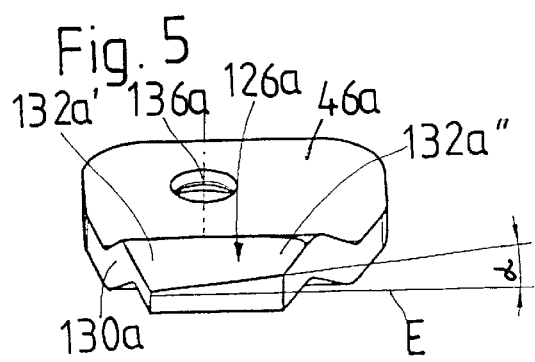
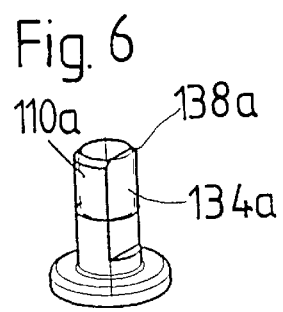

THRUST PLATE ASSEMBLY

BACKGROUND OF THE INVENTION

1. Field of the Invention

The present invention relates to a thrust plate assembly for a motor vehicle friction clutch with automatic wear compensation. The thrust plate assembly includes a housing connectable to a flywheel for common rotation about an axis of rotation, a pressure plate arranged substantially fixedly in terms of rotation in the housing and displaceable in the axial direction with respect thereto, a force accumulator supported between the housing and the pressure plate, a wear-adjustment device arranged in the support path of the force accumulator between the force accumulator and one component of the housing and the pressure plate having at least one adjustment element that is displaceable for wear compensation and is preloaded in a wear-adjustment direction, at least one play indicator arrangement including a blocking/detection element arranged on the one component and having a blocking section designed to act on the wear-adjustment device to prevent a movement of the at least one wear-adjustment element in the wear-adjustment direction, and a stop component which is in interaction or can be brought into interaction with a detection section of the blocking/detection element, the stop element being displacable with respect to the one component in the event of wear, the blocking/detection element being brought into a position for releasing the at least one adjustment element to move in the wear-adjustment direction by the interaction with the stop component.

2. Description of the Related Art

Thrust plate assemblies used in motor vehicle friction clutches with automatic wear compensation are known. These thrust plates include components which interact for wear compensation and/or also for wear detection for the new friction clutch which is to be assembled in such a manner with respect to one another that the friction clutch can have a clutch characteristic which remains constant throughout the entire operating life, without being significantly impaired by wear which occurs. During production and/or assembly of these known thrust plate assemblies, problems arise in arranging the components which interact for wear compensation and/or also for wear detection. In this context, it is particularly important for manufacturing reasons that the clutch disks or other components of a clutch of this type have certain manufacturing tolerances. However, the tolerances required for manufacturing reasons may result in a wear detection device or wear compensation device being unable to function correctly right from the start of the operating life.

SUMMARY OF THE INVENTION

The object of the present invention is to provide a thrust plate assembly and a method for setting a basic installation configuration of a thrust plate assembly for a clutch having wear compensation which can be used to ensure that the clutch provides an operating characteristic which remains substantially constant and is unaffected by wear throughout the entire operating life.

According to a first embodiment of the present invention, the object is met by a thrust plate assembly for a motor vehicle friction clutch with automatic wear compensation including a housing that is or can be fixed to a flywheel for common rotation about an axis of rotation, a pressure plate which is substantially fixed with respect to rotation in the housing and axially displaceable thereto, a force accumulator such as a diaphragm spring which is supported on the housing and on the pressure plate, and a wear-adjustment device arranged in the support path of the force accumulator between the force accumulator and one component out of the housing and the pressure plate. The wear-adjustment device has at least one adjustment element that is displaceable for wear compensation and is preloaded in a wear-adjustment direction. The thrust assembly also comprises at least one play indicator arrangement including a blocking/detection element arranged on the one component and designed with a blocking section to act on the wear-adjustment device to prevent a movement of the at least one wear-adjustment element in the wear-adjustment direction and a detection section which is in interaction or can be brought into interaction with a stop component which can be displaced with respect to the one component in the event of wear. The blocking/detection element is brought into a position for releasing the at least one adjustment element to move in the wear-adjustment direction in response to wear by interaction with the stop component which has a stop face region with which the detection section is or can be brought into interaction.

According to the present invention, the face sections of the stop face region may be arranged at different axial positions. To select the position of the face section which for interaction with the detection section, the positioning of the stop component can be adjusted with respect to another component bearing the stop component.

A thrust plate assembly of this type allows the interaction characteristic of the stop component with the detection section to be set by suitable selection of the positioning of the stop component. Suitable selection of the positioning of the stop component when the thrust plate assembly is new ensures that wear which occurs is compensated for and there is no need for a certain minimum wear to occur before the arrangement for wear compensation can become active in any respect right from the beginning of the operating life of a friction clutch which has a thrust plate assembly of this type.

By way of example, the thrust plate assembly according to the present invention may include a stop component arranged in a substantially fixed position in the axial direction on the other component while its stop face region is arranged so that it can move substantially transversely to the axis of rotation for selection of the position of the face section which is intended to interact with the detection section.

To hold the stop component in the desired way with respect to the other component, the other component may include a fixing element which is held in a rotationally fixed manner with respect thereto and pivotably bears the stop component. The required freedom of choice in setting the positioning of the stop component can be obtained by the fact that the stop component can be pivoted with respect to the fixing element by overcoming a frictionally locking connection which acts between the stop component and the fixing element. Furthermore, it is advantageous if the stop component can be fixed to the other component by the fixing element.

The configuration in which face sections may be positioned with different axial positions are to be provided for the desired setting option may be achieved when the stop face region of the stop component is designed with a surface region which is inclined with respect to a plane which is substantially orthogonal to the axis of rotation.

The thrust plate assembly of the present invention may also include a retaining element arranged for retaining the blocking/detection element and preventing movement of the blocking/detection element toward the wear-adjustment device when the blocking/detection element is moved into its position for releasing the at least one adjustment element.

The utilization of the available space is optimized if the one component comprises the pressure plate and if the other component comprises the housing.

According to a further embodiment of the present invention, the object is met by a thrust plate assembly for a motor vehicle friction clutch with automatic wear compensation, including a housing which is fixed or can be fixed to a flywheel for common rotation about an axis of rotation, a pressure plate which is arranged substantially fixedly in terms of rotation in the housing and can be displaced in the axial direction with respect thereto, a force accumulator such as a diaphragm spring supported on the housing and on the pressure plate, and a wear-adjustment device arranged in the support path of the force accumulator between the force accumulator and one component out of housing and pressure plate. The wear-adjustment device has at least one adjustment element which can be displaced for the purpose of wear compensation and is preloaded in a wear-adjustment direction. The thrust plate assembly further comprises at least one play indicator arrangement comprising a blocking/detection element which is arranged on the one component and is designed with a blocking section to act on the wear-adjustment device to prevent a movement of the at least one wear-adjustment element in the wear-adjustment direction. The blocking section is in interaction or can be brought into interaction with a detection section having a stop component which can be displaced with respect to the one component in the event of wear. In response to wear, the blocking/detection element may be brought, by means of the interaction with the stop component, into a position for releasing the at least one adjustment element to move in the wear-adjustment direction, the stop component having a stop face region with which the detection section is or can be brought into interaction.

The stop component is arranged on another component which can be displaced with respect to the one component out of the pressure plate and the housing in the event of wear. The stop component is arranged such that its axial positioning can be changed.

This embodiment of the present invention also utilizes the same basic effect, namely the possibility of being able to set the axial position of the stop face region, i.e. being able to set it axially in its region which interacts with the detection section.

In this embodiment, the stop component may be in threaded engagement with the other component and the axial positioning of the stop component with respect to the other component may be changed by rotation.

A thrust plate assembly constructed in this way may further include a fixing member via which the stop component can be fixed to the other component.

The axially adjustable positioning of the stop component with respect to the other component may be achieved by designing the stop component as a threaded bolt. The bolt together with at least one region of a bolt head forms the stop face region. In this case, the fixing member preferably comprises a lock nut screwed onto the stop component. In a thrust plate assembly according to this embodiment, a retaining element may be provided for retaining the blocking/detection element when the blocking/detection element is moved into its position for releasing the at least one adjustment element, such that the blocking/detection element is prevented from moving toward the wear-adjustment device. Furthermore, in this embodiment, the one component comprises the pressure plate and the other component comprises the housing.

According to a further aspect of the present invention, the object is met by a method for adjusting a basic installation configuration of a thrust plate assembly according to the present invention, the method including the following steps:

(a) displacing the pressure plate with respect to the housing in the axial direction, counter to the preloading force of the force accumulator, beyond a basic installation position of the pressure plate, which basic installation position the pressure plate adopts, after assembly of the thrust plate assembly together with at least one clutch disk and a flywheel, with a substantially unworn clutch disk, in the engaged state when bearing on the clutch disk, into an installation preparation position, and (b) setting an interaction positioning of the stop component with respect to the other component in such a manner that the stop face region of the stop component is in contact, by means of one of its face sections, with the detection section after the installation preparation position has been reached.

The significant aspect of this procedure according to the invention is that the pressure plate and therefore also the force accumulator and/or the detection section are first moved into a position which they will not adopt during actual operation. The interaction positioning of the stop component is then performed while the pressure plate is in the installation preparation position. This ensures that when the pressure plate moves out of this installation preparation position, the detection section starts to interact with the stop component and allows for wear compensation.

Furthermore, step (b) may include pivoting the stop element counter to a frictional connection between the stop element and a fixing element which bears the stop element on the other component. The fixing element is preferably being held in a rotationally fixed manner on the other component.

To prevent undesirable wear compensation from occurring before assembly of the thrust plate assembly with a flywheel, i.e. before a friction clutch is completed, the stop component is provided with an axial movement play with respect to the other component after the interaction positioning of the stop component with respect to the other component has been set. The extent of the axial movement play at least corresponds to the movement travel of the detection section which occurs under maximum relaxation of the force accumulator. The stop component may be fixed to obtain the interaction positioning set in step (b) after the thrust plate assembly has been assembled with the at least one clutch disk and the flywheel, thereby eliminating the axial movement play with respect to the other component. According to an alternative embodiment, the occurrence of undesirable wear compensation of this nature prior to assembly with a flywheel may be prevented by holding the pressure plate in or close to the installation preparation position until after the assembly of the thrust plate assembly with the at least one clutch disk and flywheel after the interaction positioning of the stop component with respect to the other component has been set.

According to a further embodiment of the present invention, the object is met by a method for adjusting a basic installation configuration of a thrust plate assembly according to the present invention, the method comprising the following steps:

(a) displacing the pressure plate with respect to the housing in the axial direction, counter to the preloading force of the force accumulator, beyond a basic installation position of the pressure plate, which basic installation position the pressure plate adopts, after assembly of the thrust plate assembly together with at least one clutch disk and a flywheel, with a substantially unworn clutch disk, in the engaged state when bearing on the clutch disk, into an installation preparation position, and (b) setting the axial positioning of the stop component with respect to the other component in such a manner that the detection section is in contact with the stop face region after the installation preparation position has been reached.

In this embodiment, suitable setting of the axial position of that surface region of the stop component which interacts with the detection element ensures that wear compensation is possible right from the beginning of operation of a friction clutch containing the thrust plate assembly.

The stop component may be fixed with respect to the other component after the axial positioning of the stop component has been set. Furthermore, the pressure plate is preferably held in or close to the installation preparation position until after assembly with the at least one clutch disk and the flywheel after the axial positioning of the stop component has been set.

To simplify the entire operation of constructing a friction clutch having a thrust plate assembly according to the present invention, the installation preparation position of the pressure plate is a position in which the force accumulator acting on the pressure plate is deformed into a predetermined positioning, preferably a positioning which the force accumulator adopts in the engaged state of the clutch when the friction clutch has been assembled. Furthermore, the installation preparation position of the pressure plate may comprise a position in which the force accumulator acting on the pressure plate produces a predetermined reaction force, preferably a reaction force which the force accumulator generates in the engaged state as a pressure-exerting force when the friction clutch has been assembled.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 3 is a partial sectional view, corresponding to that shown in FIG. 1, of a thrust plate assembly according to a further embodiment of the present invention;

FIG. 5 is a perspective view of an interaction element used in the thrust plate assembly of FIG. 3; and FIG. 6 is a perspective view of a fixing bolt, by which the element illustrated in FIG. 5 can be fixed to the housing of the thrust assembly in FIG. 3.

DETAILED DESCRIPTION OF THE PRESENTLY PREFERRED EMBODIMENTS

Figure 1:
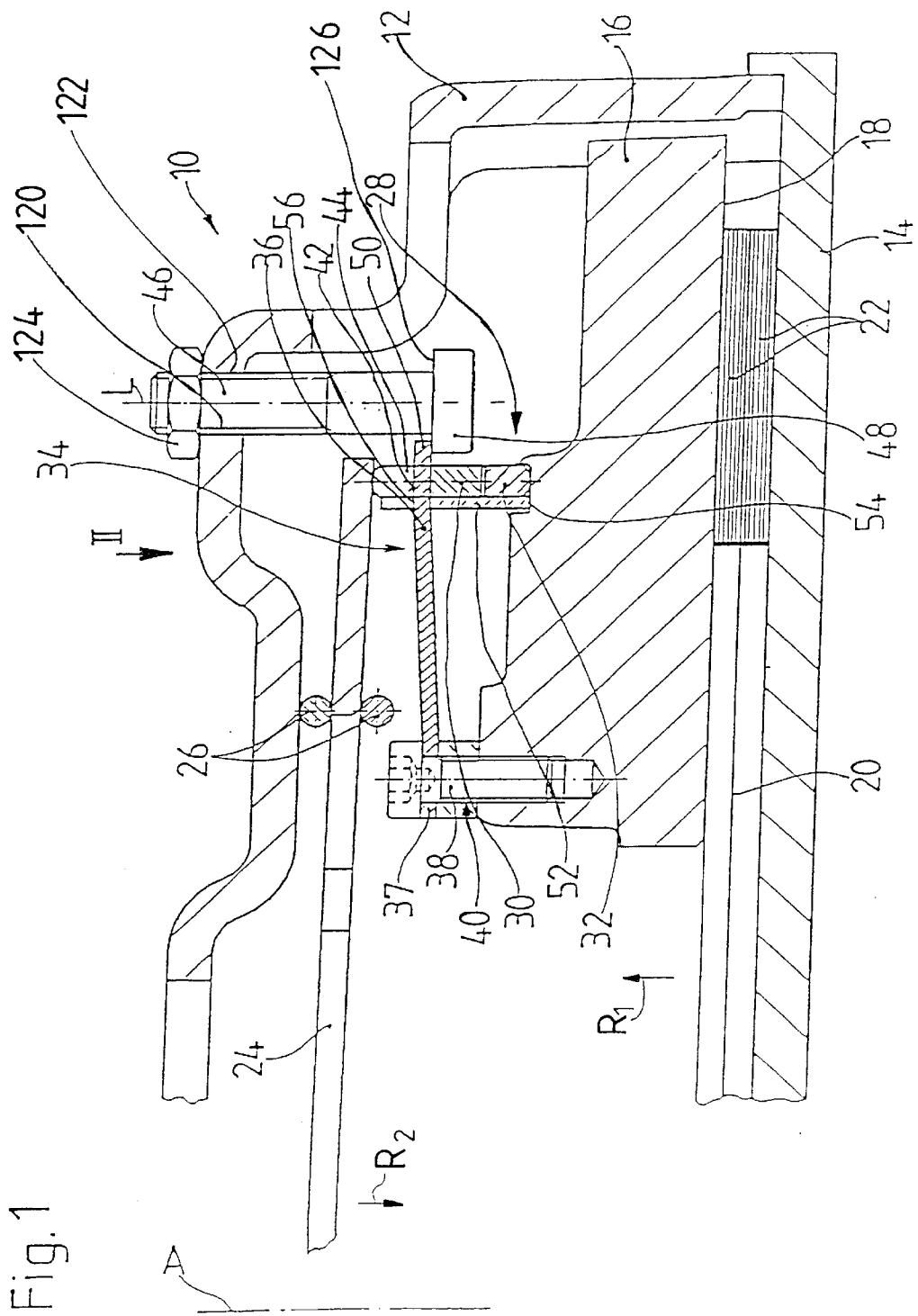
FIG. 1 is a longitudinal sectional view of a thrust plate assembly according to a first embodiment of the present invention.

A first embodiment of a thrust plate assembly 10 according to the present invention along with parts of a friction clutch containing this assembly is shown in FIG. 1 in a partial longitudinal section. The thrust plate assembly 10 comprises a housing 12 which, in a manner known per se, may be assembled, i.e. connected in a rotationally fixed manner, to a flywheel 14 (shown diagrammatically in FIG. 1) to form a motor vehicle friction clutch. The housing 12 then rotates together with the flywheel 14 about an axis of rotation A.

A pressure plate 16 is arranged in the housing 12 and connected to the housing 12 by tangential leaf springs (not shown) or similar elements such that the pressure plate 16 may be displaced in the direction of the axis of rotation A but is rotationally fixed with respect to the housing 12. A clutch disk 20 (shown diagrammatically in FIG. 1) together with its friction linings 22 may be clamped, in the engaged state, between a frictional surface 18 of the pressure plate 16 and the flywheel 14. A force accumulator 24, which in the embodiment illustrated comprises a diaphragm spring, is supported on the housing 12 by wire rings 26 in a radially central region of the force accumulator 24, in a manner known per se. The wire rings 26, together with the diaphragm spring 24 held between them, are supported by holding bolts (not shown) on the housing 12. The radially outer side of the force accumulator 24 acts on a wear-adjustment device 28, so that the wear-adjustment device is pressed between the force accumulator 24 and the pressure plate 16 on the side of the pressure plate 16 which is remote from the flywheel 14. In the embodiment of FIG. 1, the wear-adjustment device 28 comprises two adjustment rings 30, 32. The adjustment ring 30 is acted on by the force accumulator 24 and the adjustment ring 32 lies axially between the adjustment ring 30 and the pressure plate 16. On their mutual facing surface regions, the adjustment rings 30, 32 have complementary sawtooth configurations or inclined-surface configurations running in the circumferential direction, so that the adjustment rings 30, 32 may be displaced in the circumferential direction with respect to one another by respective sawtooth faces bearing against one another, i.e. in the event of relative rotation of the adjustment rings 30, 32 these sawtooth faces slide along one another. As a result of this inclined arrangement, the relative displacement in the circumferential directions leads to an increase in the overall axial extent of the wear-adjustment device 28. The two adjustment rings 30, 32 are preloaded in a manner known per se by one or more springs 33 for the purpose of this rotation in the circumferential direction with respect to one another.

Furthermore, a play indicator arrangement 34 is mounted on the pressure plate 16 which substantially comprises a leaf spring element 36 fixed to the pressure plate 16. A radially inner end region 37 of the leaf spring element 36 is screwed securely to the pressure plate 16 by a threaded bolt 38 or other fastening device, with a support element 40 arranged between the leaf spring element 36 and the pressure plate 16.

The leaf spring element 36 is connected to the pressure plate 16 such that the leaf spring element 36 is held non-rotatably on the pressure plate 16, i.e. so that it cannot rotate about an axis which is parallel to the axis of rotation A. A radially outer region of the leaf spring element 36 forms a blocking section 42. The leaf spring element 36 rests on the adjustment ring 30 so that the wear-adjustment device 28, in the axial direction, is clamped between the leaf spring element 36 and the pressure plate 16 by the resilient preloading force of the leaf spring element 36. The preloading force of the leaf spring element 36 is selected such that, irrespective of the state of wear which is yet to be described below, this preloading force is always sufficient to prevent relative rotation of the adjustment rings 30, 32 as a result of the preloading action of the spring 33.

Figure 2:
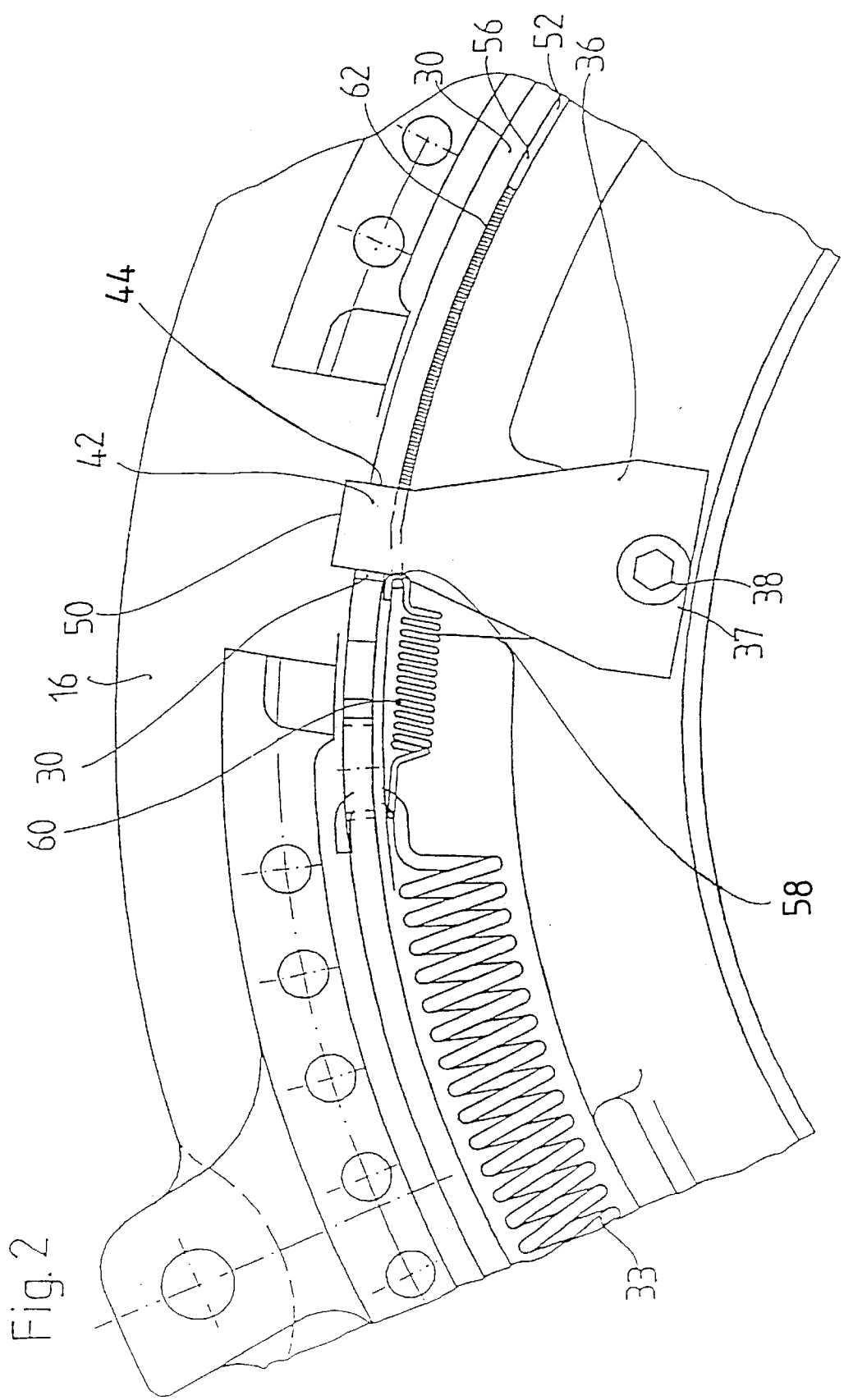
FIG. 2 is a partial axial view of the thrust plate assembly of FIG. 1 as viewed along the viewing direction II.

FIGS. 1 and 2 show that the blocking section 42 of the leaf spring element 36 engages a recess 44 in the adjustment ring 30. Since the leaf spring element 36 is rotationally fixedly secured on the pressure plate 16, the adjustment ring 30 is blocked against rotation with respect to the pressure plate 16. When wear compensation occurs, which is still to be described below, it is only possible for the adjustment ring 32 to rotate with respect to the pressure plate 16 and therefore also with respect to the adjustment ring 30, about the axis of rotation A.

An interaction bolt 46 is arranged on the housing 12 as a stop component which extends axially toward the pressure plate 16 and ends in the region of the wear-adjustment device 28. The end region of the interaction bolt 46 in the region of the wear adjustment device is designed to be eccentric, i.e. not rotationally symmetrical, with respect to the longitudinal axis L of the interaction bolt 46. Furthermore, this end region includes an interaction section 48 designed for interaction with a detection section 50 of the leaf spring element 36. The detection section 50 extends radially beyond the wear-adjustment device 28.

A retaining element 52, which is of elongate, wedge-like configuration, is provided between the pressure plate 16 and the leaf spring element 36. The retaining element 52 has a first wedge face 54 facing the pressure plate 16 such that the retaining element 52 rests on the pressure plate 16 via the first wedge face 54 directly radially inside the wear-adjustment device 28 and extends in the circumferential direction along a part of the adjustment rings 32, 30. The leaf spring element 36 bears against a second wedge face 56 of the retaining element as is described in more detail below. The retaining element 52 is displaceable in the circumferential direction and is under preloading from a preloading spring 60 which has an end region engaging an opening 58 of the retaining element 52 and another end region is suspended from another component such as the end of the spring 33 which is attached to the adjustment ring 32. In the embodiment of FIG. 1, the spring 60 is a tension coil spring. It should be pointed out that both the spring 33 and the spring 66 may in each case be designed as compression coil springs or tension coil springs.

In following text describes the actions of the thrust plate assembly 10 according to the present invention in the event of wear.

When the friction linings 22 of the clutch disk 20 are in an unworn state, the detection section 50 does not bear or bears without preloading against the interaction section 48 of the interaction bolt 46. If, for example, during a clutch engagement operation the friction linings 22 become worn, their axial extent is reduced in the region between the pressure plate 16 and the flywheel 14 and the entire pressure plate 16, together with the components arranged thereon and the wear-adjustment device 28, moves in the axial direction toward the flywheel 14, under preloading from the force accumulator 24. If the wear is sufficiently great, the detection section 50 contacts the interaction section 48 during the process and the leaf spring element 36 is prevented from moving further in the axial direction together with the pressure plate 16. If the wear is sufficiently great, the blocking section 42 of the leaf spring element 36 is then lifted off the adjustment ring 30, thereby creating an axial space between the adjustment ring 30 and the blocking section 42. In a corresponding way, the spring element 36 would be lifted off the wedge face 56 of the retaining element 52 if the retaining element 52 remained stationary. However, the retaining element 52 is under the preloading force of the spring 60. Accordingly, the retaining element 52 would be displaced in the circumferential direction until this increased axial distance is once again filled up by the retaining element 52 during this axial relative movement between the leaf spring element 36 in its radially outer region and the pressure plate 16. When the leaf spring element 36 is lifted off of the adjustment ring 30, the wear-adjustment device 28 is no longer acted on by the leaf spring element 36 but, on account of the engaged clutch state, is still acted on by the force accumulator 24.

Only during a following clutch release operation is the wear-adjustment device 28 at least partially released. During the clutch release operation, the radially inner portion of the force accumulator 24 is moved toward the flywheel 14 and the radially outer portion is moved away from the flywheel 14. The movement of the radially outer portion of the force accumulator 24 away from the flywheel 14 at least partially releases the wear-adjustment device 28 and allows the wear-adjustment device 28 to compensate for the space which has been produced between the leaf spring element 36, i.e. its blocking section 42, and the adjustment ring 30 by rotation of the adjustment ring 32 by the preloading action of the spring 33. During this rotation of the adjustment ring 32, the inclined faces of the adjustment rings 30, 32 slide along one another, so that the adjustment ring 30 is displaced axially until it once again contacts the leaf spring element 36. As a result, precisely the degree of wear which has previously been detected as a result of the leaf spring element 36 being lifted off the wear-adjustment device 28 is compensated for.

During the clutch release operation, the preloading action of the tangential leaf springs (not shown) causes the pressure plate 16 to move away from the flywheel 14. When the pressure plate 16 moves away from the flywheel 14, the detection section 50 of the leaf spring element 36 is also lifted off the interaction section 48 of the interaction bolt 46. However, since the retaining element 52 has already moved into a position in which the leaf spring element 36 which has been lifted off the wear-adjustment device 28, a movement back into the starting position in which it rests on the wear-adjustment device 28 is prevented and it is actually possible for the wear which has occurred to be compensated for by increasing the axial extent of the wear compensation means 28.

During a subsequent engagement operation, the total axial extent of the unit between the contact region of the diaphragm spring 24 on the adjustment ring 30 and that surface of the friction linings 22 which bears on the flywheel 14, which includes the wear-adjustment device 28, pressure plate 16 and clutch disk 20 with friction linings 22, corresponds to the unworn state of the friction linings 22.

In the pressure plate assembly according to the invention, the preloading force provided by the spring elasticity of the leaf spring element 36 may be set such that it is greater in any axial position of the leaf spring element 36, i.e. irrespective of the actual axial extent of the wear-adjustment device 28, than the preloading force provided by the spring 33 for the wear-adjustment device 28. In this case, there is no need to ensure spring equilibrium between these two springs because the compensation for the wear is carried out until the adjustment ring 30 once again contacts the blocking section 42 of the leaf spring element 36. The leaf spring element 36 is ideally designed such that it presents substantially the same bearing force on the adjustment ring 30 throughout the working region of the leaf spring element 36, i.e., in the region between unworn friction linings and the maximum degree of wear to the friction linings. It is also possible to provide for a decreasing contact force of the leaf spring element 36.

During wear compensation, both the retaining element 52 and the adjustment ring 32 move in the same direction and approximately to the same extent. However, since one end region of the spring 60 is fixed to the retaining element 52 and the other end region is fixed with respect to the adjustment ring 32, the spring 60, irrespective of the amount of wear compensation operations carried out, remains in approximately the same installation position. Therefore, approximately the same preloading force may be provided for the retaining element 52 throughout the entire operating life. Since the leaf spring element 36 rests on the second wedge face 56 of the retaining element 52 and, in the process, a shear force which counteracts the preloading force of the spring 60 is generated on the retaining element 52, it is advantageous if, as shown in FIG. 2, the retaining element 52 is designed with a set of steps or teeth 62 in the region of its second wedge face 56. Individual steps of a set of steps may lie parallel to the wedge face 54 so that a shear force acting in the circumferential direction is not produced. If teeth 62 are arranged on the second wedge face 56, mating teeth can be provided on the blocking section 42 of the leaf spring element 36 to provide a positively locking engagement between the leaf spring element 36 and the retaining element 52. In general, however, the wedge angle of the retaining element 52 is designed such that a self-locking action is present without the teeth.

The retaining element 52 may be designed to cover a limited circumferential extent. However, the retaining element may also be designed as an annular element which, in the region of the leaf spring element 36, is then designed with the respective wedge-like faces. It should be pointed out that a plurality of leaf spring elements 36 of this type may be distributed over the circumference, in which case they can then interact with corresponding retaining elements 52 or wedge faces of an annular retaining element. The leaf spring element 36 may be replaced by a rigid element which is arranged on the radially inner side of the pressure plate 16 so that the rigid element is pivotal about an axis of rotation which lies in the circumferential direction and is preloaded toward the ring 30 by a spring acting between the pressure plate 16 and the rigid element. If this spring is designed as a tension coil spring which extends substantially in the axial direction, it may be ensured that the change in spring force which occurs per increase in pivot angle or per change is always substantially identical when the rigid element pivots.

The detection section 50 may also, for example, be in a region of the leaf spring element 36 which lies between the region where the leaf spring element 36 is fitted to the pressure plate 16 and the blocking section 42. In this optional embodiment, the interaction bolt 46 may be arranged radially inside the wear-adjustment device 28. Of course, a suitable passage aperture would have to be provided in the force accumulator 24.

The interaction bolt 46, which serves as a stop component in its interaction section 48, is designed as a screw and has an externally threaded section 120. This section is screwed into a threaded opening 122 provided in the housing 12. A lock nut 124 is screwed onto that section of the interaction bolt 46 which projects outward beyond the housing 12. Furthermore, it is possible for a tool-engagement formation such as, for example, a hexagon socket or a screwdriver slot, to be provided in this end region on the interaction bolt 46, to rotate the interaction bolt 46 about its longitudinal axis L from the outside and to set the position of the interaction bolt 46. This also sets the axial position of a stop face region 126 of the interaction bolt 46, against which the detection section 50 may come to bear. Once the desired position has been set, the lock nut 124 may be tightened to retain the predetermined position of the interaction bolt 46 on the housing 12.

The following text describes how the interaction bolt 46 is used to ensure that the thrust plate assembly 10 shown in FIGS. 1 and 2 has a constant characteristic action throughout the entire operating life and that wear compensation is also possible throughout the entire operating life, i.e. right from the start of the operating life. In this context, it is initially assumed that FIG. 1 shows a basic engagement position of the pressure plate 16 which the latter adopts with an unworn clutch disk 20 in the engaged state of the friction clutch constructed according to the present invention.

By way of example, after assembly of the thrust plate assembly 10 according to the invention, in a mounting or altering device, the pressure plate 16 is displaced in the direction of the arrow $R_1$, counter to the preloading action of the force accumulator 24, i.e. of the diaphragm spring 24, specifically sufficiently far for it to have been displaced further into the housing 12 than would be the case in the basic engagement position illustrated in FIG. 1. This displacement of the pressure plate 16 in the direction of the arrow $R_1$ leads to the radially inner region of the force accumulator 24, i.e., the diaphragm spring, being displaced by its spring tongues in the direction of an arrow $R_2$. The pressure plate 16 is displaced so far in the direction $R_1$ that ultimately the force accumulator after displacement of the spring tongues in direction $R_2$, has reached the basic installation position described above, i.e., that installation position which the force accumulator is supposed to be in when a clutch of this type is in its engaged position and the friction linings 22 are as yet unworn. To prevent the force accumulator 24 from being pushed beyond its desired installation position after such a displacement of the pressure plate 16 in the direction $R_1$ to beyond the basic engagement position of the pressure plate 16, the wear-adjustment device 28, i.e. the adjustment rings 30, 32, must be adjusted to a relative rotational position which produces a total axial extent of the wear-adjustment device 28 which is actually shorter than the axial extent of the wear-adjustment device 28 for the new state.

Once this displacement of the pressure plate 16 to an installation preparation position beyond its basic engagement position has been completed, a tool is used to turn the interaction bolt 46 until the stop face region 126 being carried along with the interaction bolt 46 contacts the detection section 50, as shown in FIG. 1. Then, as has already been mentioned, the lock nut 124 is tightened to fix the interaction bolt 46 in this position. To prevent loosening which is induced by vibrations from occurring, a fixed connection between the interaction bolt 46 and the lock nut 124 and/or between the lock nut 124 and the housing 12 such as, for example, by welding or adhesive bonding, may be made.

This thrust plate assembly 10 may be held in this position by, for example, a transport securing means, i.e. the pressure plate 12 is held in or close to its installation preparation position with respect to the housing 12. When the thrust plate assembly 10 is then assembled with a clutch disk 20 and a flywheel 14 to form a friction clutch, as illustrated in FIG. 1, the pressure plate 16 is released and moves at least slightly toward the flywheel until it contacts the clutch disk and assumes its basic engagement position. The thrust plate assembly 10 is designed such that this occurs even with the thickest possible clutch disk 20 including the possible manufacturing tolerances thereof. This movement of the pressure plate 16 occurs in response to the action of force from the force accumulator 24. As the pressure plate moves, the force accumulator 24 pivots into a position in which the radially inner region of the force accumulator is initially further away from the flywheel 14 than is inherently desirable for the basic engagement position of the pressure plate 16. During this movement of the pressure plate 16 toward the flywheel 14, however, the detection section 50, which has previously already come into contact with the stop face region 126, and therefore the entire leaf spring element 36 are held in place, so that they are lifted off the adjustment ring 30. During a subsequent clutch release operation, the force accumulator 24 releases the wear-adjustment device 28. Even though no wear at all has occurred, the wear-adjustment device 28 carries out a compensation movement until the difference in distance between the basic engagement position and the installation preparation position has been compensated for again and the adjustment ring 30 comes into contact with the leaf spring element 36. From this state, the force accumulator 24, with the pressure plate 16 in the basic engagement position, then adopts precisely the position which it previously adopted during the setting of the axial position of the stop face region 126, i.e. its positioning which is intended for the engagement position of the clutch.

If, during operation, the friction linings 22 then become worn, it is possible, as described above, for the pressure plate 16 to be moved out of its basic engagement position and increasingly close to the flywheel 14. The installation position of the force accumulator 24—with respect to the engaged positioning of the clutch—remains unchanged.

It should be noted that, of course, when carrying out the setting and movement of the pressure plate 16 in the direction $R_1$ to beyond the basic engagement position, the axial travel or axial movement of the force accumulator 24 in the direction $R_2$ does not necessarily have to be observed. It is known that force accumulators of this type, which are designed as diaphragm springs, have a certain spring characteristic. More specifically, these diaphragm springs have a characteristic with decreasing spring force as the spring becomes increasingly flat. It is therefore also possible to displace the pressure plate 16 in the axial direction until a specific reaction force of the force accumulator 24 is produced, which ultimately corresponds to a specific installation position of the force accumulator 24.

An alternative embodiment of the thrust plate assembly 10a according to the present invention is illustrated in FIGS. 3–6. Components which correspond to components which have been described above in terms of structure and/or function are denoted by the same reference numeral with the addition of a suffix "a".

Figure 4:
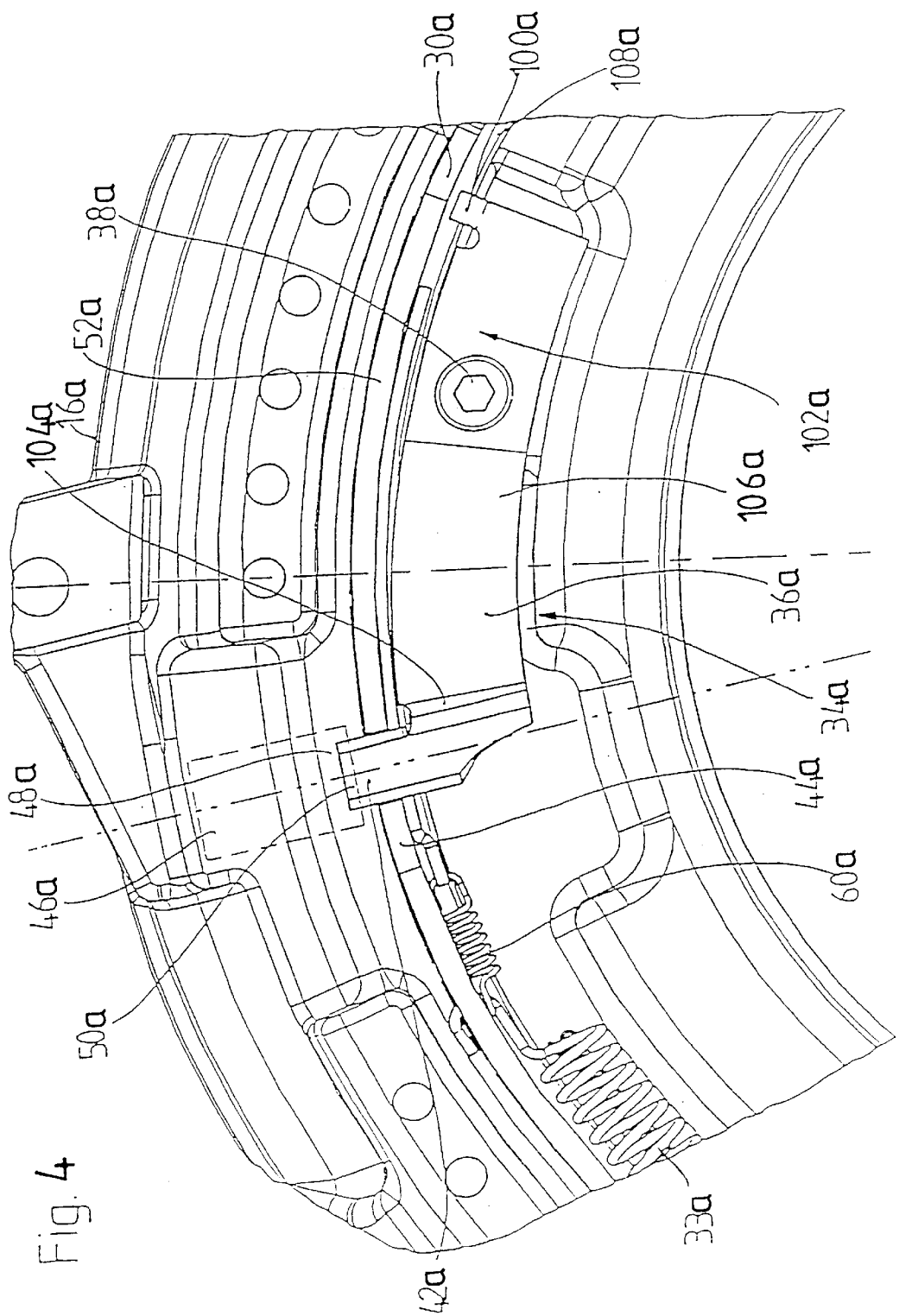
FIG. 4 is a partial axial view of the thrust plate assembly of FIG. 3.

A significant difference from the thrust plate assembly 10 of FIGS. 1–2 described above and the thrust plate assembly 10a of FIGS. 3–6 is that a leaf spring element 36a of the thrust plate assembly 10a, which forms a blocking/detection element, extends substantially in the circumferential direction, whereas previously its principal direction of extent was substantially radial. As shown in FIGS. 3 and 4, an end region 102a of the leaf spring element 36a is screwed onto a pressure plate 16a of the thrust plate assembly 10a by a threaded bolt 38a so that the leaf spring element 36a then extends in the circumferential direction. The other end region 104a includes a radial projection which forms a blocking section 42a of the leaf spring element 36a. The end regions 102a and 104a of the leaf spring element 36a are connected via a base body section 106a. The blocking section 42a rests on an adjustment ring 30a of a wear adjustment device 28a which also includes a further adjustment ring 32a. Further outward in the radial direction, the radial projection of the end region 104a forms a detection section 50a of the leaf spring element 36a. The detection section 50a can come to bear, as a stop component, against a mating element 46a which is fixed to a housing 12a of the thrust plate assembly 10a. When wear occurs, the pressure plate 16a moves in the axial direction away from the housing 12a and toward a flywheel (not shown in FIGS. 3–6). The mating element 46a is fixed by a threaded bolt 110a to a side of the housing 12a which faces the flywheel on a radially outwardly projecting flange-like section of the housing 12a. Further, the mating element 46a extends radially inward, as is also indicated by dashed lines in FIG. 4. The fixing of the mating element 46a to the housing 12a is described in more detail below.

The leaf spring element 36a is arranged on the radially inner side of the adjustment rings 30a, 32a. Furthermore, the extent of the leaf spring element 36a in the circumferential direction allows the pressure plate 16 to have an enlarged central opening so that more space is available for other components such as, for example, a torsional vibration damper on a clutch disk. Nevertheless, the blocking section 42a and the detection section 50a of the leaf spring element 36a engages radially outward beyond the adjustment rings 30a, 32a to interact with a housing-side component for wear detection and wear compensation. Once again, in the embodiment shown in FIGS. 3 to 6, a retaining element 52a such as, for example, of wedge-like design is preloaded by a preloading spring 60a in a direction in which urges the retaining element 52a into a space created after the blocking section 42a has been lifted off the adjustment ring 30a therefore block the leaf spring element 36a via the end region 104a from moving back in its preloading direction.

As evident in FIGS. 3–6, the leaf spring element 36a is elastically deformed in the axial direction to generate a preloading force for the adjustment device 28a. To increase this preloading force still further, the leaf spring element 36a may, in its relaxed state, have a prior deformation or prior shaping in the opposite direction, i.e. it is possible for it to be curved in the opposite direction to the intended bending direction and for the leaf spring element 36a to be twisted along its longitudinal axis so that the blocking section 42a and the detection section 50a are likewise preloaded and pre-deformed in a direction which is opposite to the deformation which subsequently occurs.

Referring to FIG. 4, the end region 102a of the leaf spring element 36a has a securing projection 100a which is produced, for example, by bending over a tab formed by being stamped out. The securing projection 100a engages a circumferential groove 108a on the pressure plate 16 in which the adjustment ring 32a is guided and the retaining element 52a is accommodated. This secures the leaf spring element 36a against twisting, even though, for cost and weight reasons, only a single retaining screw 38a is used.

In the embodiment of FIGS. 3–6, the mating element 46a, which serves as a stop component, is designed as a plate-like component which may be curved in a central region 130a to match the shape of the pressure plate 16a. A stop face region 126a of the mating element 46a is provided for interacting with the detection section 50a. The mating element 46a is designed such that the stop face region 126a is inclined along the circumferential direction with respect to a plane which is orthogonal to the axis of rotation A and is illustrated by the line E in FIG. 5. The inclination shown is at an angle α which does not necessarily have to be constant over the circumferential extent. Accordingly, the stop face region 126a has face sections 132a' and 132a" which, when the mating element 46a is fitted to the housing 12a, are in different axial positions with respect to the axis of rotation A.

A bolt element 110a is shown in FIG. 6 which is used to fix the mating element 46a to the housing 12a. The bolt element 110a such that it has an external circumference which is not rotationally symmetrical. For example, the bolt element 110a is flattened on one side 134a. In a corresponding way, the housing 12a has a passage opening which is correspondingly not rotationally symmetrical, so that the bolt element 110a is axially displaceable with respect to the housing 12a but is prevented from rotating relative to the housing 12a when it is inserted in the passage opening. The bolt element 110a also passes through an opening 136a provided in the mating element 46a such that a frictionally locking connection is formed between the bolt element 110a and the mating element 46a. The frictional force allows the bolt element 110a and the mating element 46a to rotate with respect to one another and is selected such that automatic movement is prevented. However, movement may be applied by hand or by a tool.

The thrust plate assembly 10a may be constructed according to the following procedure. After the bolt element 110a has been pressed into the opening 136a in the mating element 46a, the bolt element 110a and the mating element 46a are arranged on the housing 12a. That is, the bolt element 110a is fitted into the associated passage opening in the housing 12a. The bolt element 110a has an external screw thread 138a on the end which is inserted into the passage opening in the housing 12a. A fixing nut 140a is screwed onto the external screw thread 138a on that section of the bolt element 110a which projects outward beyond the housing 12a. The fixing nut 140a is screwed onto the bolt element 110a such that the mating element 46a bears with slight pressure against the housing 12a and so that it is fundamentally still possible to effect the above-mentioned manual or tool-induced rotation of the mating element 46a with respect to the bolt element 110a and therefore also with respect to the housing 12a. The mating element 46a may include a tool engagement formation on a radially outer circumferential region 142a such as, for example, notches or other formations.

After the bolt element 110a and mating element 46a are attached to the housing 12, the pressure plate 16a is moved into its installation preparation position, i.e. it is displaced in direction $R_1$. Since the thrust plate assembly 10a shown in FIG. 3 is designed for a pull-type clutch, the radially inner spring tongues of the force accumulator 24a will now move in the direction $R_2$ which corresponds to the direction $R_1$. When the installation preparation position has been reached, i.e. the force accumulator 24a has once again reached the position which it will subsequently be in during clutch operation in the engaged positioning, the mating element 46a is rotated relative to the housing 12a and the bolt element 110a such that one of its face sections 132a', 132a" of different axial positioning comes to bear against the detection section 50a of the leaf spring element 36a. To avoid overloading the bearing contact, the detection section 50a of the leaf spring element 36a may have a curved design or the leaf spring element 36a may be inclined in the same way as the inclined stop face region 126a.

Once this interaction positioning of the mating element 46a has been reached, the fixing nut 140a is opened slightly again, specifically until it has been lifted off the housing 12a with a predetermined movement play S. It is now possible for the mating element 46a together with the bolt element 110a to be displaced by the movement play S with respect to the housing 12a. Since it is also possible to tilt the mating element 46a and bolt element 110a, the mating element 46a also moves away from the detection section 50a. Prior to assembly with a clutch disk and a flywheel, the pressure plate 16a may be released again from the position which it previously adopted for the setting, so that the force accumulator 24a can relax. For this purpose, however, the movement play S or the axial lifting of the stop face region 126a off the detection section 50a which becomes possible as a result is selected such that it is greater than a lifting movement of the detection section 50a which is executed at the maximum relaxation of the force accumulator 24a. That is, even during relaxation of the force accumulator 24a the detection section 50a of the leaf spring element 36a does not contact with the mating element 46a. Accordingly, undesirable wear compensation during the assembly stage is prevented.

When the thrust plate assembly 10a of FIG. 3 is assembled with a clutch disk and a flywheel to form a friction clutch, the pressure plate 16a is displaced axially back in the direction $R_1$ until it adopts its basic engagement position. Next, the fixing nut 140a is tightened again and the movement play S is successively reduced. Even before the fixing nut 140a has been completely tightened and the mating element 46a has reached the position illustrated in FIG. 3, the previously selected stop face section 132a' or 132a" or any face section lying therebetween of the stop face region 126a will contact the detection section 50a. During the further tightening movement of the fixing nut 140a, the mating element 46a will then drive the detection section 50a in the direction $R_1$ (see FIG. 3) so that the blocking section 42a of the leaf spring element 36a is lifted off the adjustment ring 30a. This lifting ultimately once again corresponds to the difference in distance between the basic engagement position and the installation preparation position of the pressure plate 16a. During the clutch release operation which is subsequently carried out, initially a wear compensation movement will occur even though there is as yet no wear to the new clutch disk. The movement continues until the difference in distance has been compensated for. With the pressure plate 16a in the basic engagement position, the force accumulator 24a adopts the positioning which has previously been preset for execution of the position setting of the mating element 46a.

Therefore, both the embodiments described above ensure that the force accumulator—with respect to the engaged position—always adopts a constant positioning from the beginning of its operating life of the thrust plate assembly or friction clutch including the thrust plate assembly. This result is due to the movement of the pressure plate to beyond the basic engagement position into a position which is ultimately further disengaged and due to the fact that the wear-adjustment device 28 or 28a may become active beginning from the installation preparation position.

Consequently, a significantly improved constancy of the clutch and spring characteristic is achieved. This allows a thrust plate assembly according to the present invention to be installed in friction clutches which have a very wide range of clutch disk types, in particular with regard to their thickness. It is merely necessary to ensure—even with the thickest clutch disk and taking possible manufacturing tolerances into account—that the installation preparation position of the pressure plate is ultimately displaced further toward the housing than would be the case with a clutch disk of this type in the basic engagement position.

In all the embodiments described above, the retaining element is arranged immediately adjacent the wear-adjustment device. This ensures that the retaining element interacts with that region of the leaf spring element that comprises the blocking section. Accordingly, the position of the leaf spring element provided by the retaining element after the occurrence of wear corresponds precisely to the position which the leaf spring element should adopt in the region of its blocking section for the subsequent wear compensation. This also contributes to very precise compensation of the detected wear.

The above text has described embodiments in which the wear-adjustment device comprises two ring elements, wherein one of the two ring elements is preloaded in the wear-adjustment direction, i.e. for rotation in the circumferential direction. Of course, it is also possible for the wear-adjustment device to comprise only a single ring element preloaded to move in the wear-adjustment direction, i.e. to rotate in the circumferential direction, and to slide along a complementary inclined face of the pressure plate and/or the force accumulator via its inclined faces. Correspondingly, wear adjusting device may alternatively include individual wedge elements which, by spring preloading, are displaceable either in the circumferential direction or in the radial direction and slide along mating wedge surfaces either of the pressure plate or of the force accumulator or of a further wedge element. When the wear adjusting device comprises individual wedge elements, each wedge element or each wedge element pair should be assigned to a respective leaf spring element. Furthermore, the thrust plate assembly with the inventive structure may be designed for use with both a push actuated clutch and a pull actuated clutch. It is also possible for the wear-adjustment device to be arranged between the force accumulator and the housing. In this case, the leaf spring element may also be fitted to the housing, and the wear can, for example, be recorded with respect to the pressure plate. Also, any of the embodiments shown in FIGS. 1–6 could be designed as either a push actuated or a pull actuated thrust plate or clutch.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A thrust plate assembly for a motor vehicle friction clutch having automatic wear compensation, comprising:
   a housing connectable to a flywheel for rotation therewith about an axis of rotation;
   a pressure plate fixed with respect to rotation and axially displaceable relative to said housing;
   a force accumulator supported between said housing and said pressure plate;
   a wear adjustment device arranged in a support path of said force accumulator between said force accumulator and one component of one of said housing and said pressure plate, said wear adjustment device comprising at least one adjustment element displaceable for effecting wear compensation, said at least one adjustment element being preloaded in a wear adjustment direction;
   at least one play indicator arrangement including a blocking/detection element arranged on said one component and comprising a blocking section arranged for acting on said wear adjustment device to prevent the movement of said at least one adjustment element in the wear adjustment direction, said blocking/detection element further comprising a detection section; and
   a stop component having a stop face region and being arranged on another component of said thrust plate assembly other than said one component such that said stop component is displaceable relative to said one component in response to wear, wherein said detection section is arranged for interaction with said stop face region such that said blocking/detection element is movable into a position for releasing said at least one adjustment element and allowing movement of said at least one adjustment element in the wear adjustment direction via the interaction with said stop face region,
   said stop face region comprising at least two face sections having different axial positions with respect to said axis of rotation, wherein a position of said stop component relative to said another component is adjustable for selecting one of said at least two face sections for the interaction with said detection section.

2. The thrust plate assembly of claim 1, wherein said stop component is arranged on said another component such that said stop component is movable relative to said another component in a transverse direction relative to said axis of rotation for selection of said one of said at least two face sections and is arranged in a substantially fixed position in the axial direction relative to said another component.

3. The thrust plate assembly of claim 2, further comprising a fixing element arranged on said another component such that said fixing element is fixed with respect to rotation and wherein said stop component is pivotally arranged on said fixing element.

4. The thrust plate assembly of claim 3, wherein said stop component is connected to said fixing element via a frictionally locking connection, wherein said stop component is pivotal with respect to said fixing element by overcoming the frictionally locking connection.

5. The thrust plate assembly of claim 3, wherein said stop component is connectable to said another component via said fixing element.

6. The thrust plate assembly of claim 5, wherein said stop face region of said stop component is inclined with respect to a plane which is substantially orthogonal to the axis of rotation.

7. The thrust plate assembly of claim 1, further comprising a retaining element arranged for retaining said blocking/ detection element in the position for releasing said at least one adjustment element, thereby preventing said blocking/detection element from moving back toward said wear-adjustment device after said blocking/detection element is moved to the position for releasing said at least one adjustment element.

8. The thrust plate assembly of claim 1, wherein said one component is said pressure plate and said another component is said housing.

9. A thrust plate assembly for a motor vehicle friction clutch having automatic wear compensation, comprising:
   a housing connectable to a flywheel for rotation therewith about an axis of rotation;
   a pressure plate fixed with respect to rotation and axially displaceable relative to said housing;
   a force accumulator supported between said housing and said pressure plate;
   a wear adjustment device arranged in a support path of said force accumulator between said force accumulator and one component of one of said housing and said pressure plate, said wear adjustment device comprising at least one adjustment element displaceable for effecting wear compensation, said at least one adjustment element being preloaded in a wear adjustment direction;
   at least one play indicator arrangement including a blocking/detection element arranged on said one component and comprising a blocking section arranged for acting on said wear adjustment device to prevent the movement of said at least one adjustment element in the wear adjustment direction, said blocking/detection element further comprising a detection section; and
   a stop component having a stop face region and being arranged on another component of said thrust plate assembly other than said one component such that said stop component is displaceable relative to said one component in response to wear, wherein said detection section is arranged for interaction with said stop face region such that said blocking/detection element is movable into a position for releasing said at least one adjustment element and allowing movement of said at least one adjustment element in the wear adjustment direction via the interaction with said stop face region,
wherein the stop component is displaceable such that an axial positioning of said stop component on said another component is adjustable, and wherein said another component is displaceable relative to said one component in response to wear.

10. The thrust plate assembly of claim 9, wherein said stop component is in a threaded engagement with said another component and the axial positioning of said stop component with respect to said other component is adjustable by rotation of said stop component.

11. The thrust plate assembly of claim 9, further comprising a fixing member arranged for fixing said stop component to said another component.

12. The thrust plate assembly of claim 10, wherein said stop component is a threaded bolt including a bolt head, wherein at least one region of said bolt head forms said stop face region.

13. The thrust plate assembly of claim 12, further comprising a fixing member arranged for fixing said stop component to said another component, wherein said fixing member comprises a lock nut screwed onto said stop component.

14. The thrust plate assembly of claim 9, further comprising a retaining element arranged for retaining said blocking/detection element in the position for releasing said at least one adjustment element, thereby preventing said blocking/detection element from moving back toward said wear-adjustment device after said blocking/detection element is moved to the position for releasing said at least one adjustment element.

15. The thrust plate assembly of claim 9, wherein said one component is said pressure plate and said another component is said housing.

16. A method for adjusting a basic installation configuration of a thrust plate assembly for a motor vehicle friction clutch with automatic wear compensation, the thrust plate assembly including a housing connectable to a flywheel for rotation therewith about an axis of rotation, a pressure plate fixed with respect to rotation and axially displaceable relative to the housing, a force accumulator supported between the housing and the pressure plate, a wear adjustment device arranged in a support path of the force accumulator between the force accumulator and one component of one of the housing and the pressure plate, the wear adjustment device including at least one adjustment element displaceable for effecting wear compensation, the at least one adjustment element being preloaded in a wear adjustment direction, at least one play indicator arrangement including a blocking/detection element arranged on the one component and having a blocking section arranged for acting on the wear adjustment device to prevent the movement of the at least one adjustment element in the wear adjustment direction, the blocking/detection element further having a detection section, and a stop component having a stop face region and being arranged on another component of the thrust plate assembly other than the one component such that the stop component is displaceable relative to the one component in response to wear, wherein the detection section is arranged for interaction with the stop face region such that the blocking/detection element is movable into a position for releasing the at least one adjustment element and allowing movement of the at least one adjustment element in the wear adjustment direction via the interaction with the stop face region, the stop face region including at least two face sections having different axial positions with respect to the axis of rotation, wherein a position of the stop component relative to the another component is adjustable for selecting a selected one of said at least two face sections for the interaction with said detection section, said method comprising the following steps:
   (a) displacing the pressure plate in an axial direction relative to the housing against the preloading force of the force accumulator to an installation preparation position which is beyond a basic installation position of the pressure plate, the basic installation position being the position to be adopted by the pressure plate after assembly of the thrust plate assembly with at least one clutch disk and a flywheel to form the friction clutch in the engaged state of the friction clutch with the pressure plate bearing on the at least one clutch disk with the at least one clutch disk in the unworn state; and
   (b) adjusting an interaction position of the stop component relative to the another component of the thrust plate assembly such that the selected one of said at least two face sections of the stop face region on the stop component contacts the detection section.

17. The method of claim 16, wherein said step (b) comprises pivoting the stop element counter to a frictional connection between the stop element and a fixing element which bears the stop element on the another component, the fixing element being in a rotationally fixed position relative to the another component.

18. The method of claim 16, further comprising the step of providing the stop component with an axial movement play relative to the another component after said step (b), wherein the extent of the axial movement play corresponds to the movement travel of the detection section which occurs under maximum relaxation of the force accumulator.

19. The method of claim 18, further comprising the step of fixing the stop component to the another component, thereby eliminating the axial movement play, to obtain the interaction position of said step (b) after the thrust plate assembly has been assembled with the at least one clutch disk and the flywheel to form the friction clutch.

20. The method of claim 16, further comprising the steps of fixing the stop component to the another component and holding the pressure plate at least proximate the installation preparation position until after the assembly of the thrust plate assembly with the at least one clutch disk and the flywheel.

21. The method of claim 16, wherein the installation preparation position of the pressure plate in said step (a) is a position in which the force accumulator acting on the pressure plate is deformed into a positioning which the force accumulator adopts in the engaged state of the clutch when the friction clutch has been assembled.

22. The method of claim 16, wherein the installation preparation position of the pressure plate in said step (a) is a position in which the force accumulator acting on the pressure plate produces a reaction force which the force accumulator generates as a pressure-exerting force in the engaged state when the friction clutch has been assembled.

23. A method for adjusting a basic installation configuration of a thrust plate assembly for a motor vehicle friction clutch with automatic wear compensation, the thrust plate assembly including a housing connectable to a flywheel for rotation therewith about an axis of rotation, a pressure plate fixed with respect to rotation and axially displaceable relative to the housing, a force accumulator supported between the housing and the pressure plate, a wear adjustment device arranged in a support path of the force accumulator between the force accumulator and one component of one of the housing and the pressure plate, the wear adjustment device having at least one adjustment element displaceable for effecting wear compensation, the at least one adjustment element being preloaded in a wear adjustment direction, at least one play indicator arrangement including a blocking/detection element arranged on the one component and having a blocking section arranged for acting on the wear adjustment device to prevent the movement of the at least one adjustment element in the wear adjustment direction, the blocking/detection element further including a detection section, and a stop component having a stop face region and being arranged on another component of the thrust plate assembly other than the one component such that the stop component is displaceable relative to the one component in response to wear, wherein the detection section is arranged for interaction with the stop face region such that the blocking/detection element is movable into a position for releasing the at least one adjustment element and allowing movement of the at least one adjustment element in the wear adjustment direction via the interaction with the stop face region, wherein the stop component is displaceable such that an axial positioning of the stop component on the another component is adjustable, and wherein the another component is displaceable relative to the one component in response to wear, said method comprising the steps of:

(a) displacing the pressure plate in an axial direction relative to the housing against the preloading force of the force accumulator to an installation preparation position which is beyond a basic installation position of the pressure plate, the basic installation position being the position to be adopted by the pressure plate after assembly of the thrust plate assembly with at least one clutch disk and a flywheel to form the friction clutch in the engaged state of the friction clutch with the pressure plate bearing on the at least one clutch disk with the at least one clutch disk in the unworn state; and (b) setting the axial positioning of the stop component with respect to the another component such that the detection section contacts the stop face region after the installation preparation position has been reached.

24. The method of claim 23, further comprising the step of fixing the stop component to the another component after the axial positioning of the stop component has been set in said step (b).

25. The method of claim 23, further comprising the step of holding the pressure plate proximate the installation preparation position until assembly of the thrust plate assembly with the at least one clutch disk and the flywheel after the axial positioning of the stop component has been set up in said step (b).

26. The method of claim 23, wherein the installation preparation position of the pressure plate in said step (a) is a position in which the force accumulator acting on the pressure plate is deformed into a positioning which the force accumulator adopts in the engaged state of the clutch when the friction clutch has been assembled.

27. The method of claim 23, wherein the installation preparation position of the pressure plate in said step (a) is a position in which the force accumulator acting on the pressure plate produces a reaction force which the force accumulator generates as a pressure-exerting force in the engaged state when the friction clutch has been assembled.

* * * * *